US009962730B2

(12) United States Patent
Mizuno et al.

(10) Patent No.: US 9,962,730 B2
(45) Date of Patent: May 8, 2018

(54) METHOD FOR THE FORMATION OF MULTI-LAYER PAINT FILMS

(75) Inventors: Shigeyuki Mizuno, Yokohama (JP); Keisuke Kojima, Saitama (JP); Katsuyoshi Kaneko, Saitama (JP)

(73) Assignees: BASF Japan Ltd., Tokyo (JP); Honda Motor Co., Ltd., Tokyo (JP)

( * ) Notice: Subject to any disclaimer, the term of this patent is extended or adjusted under 35 U.S.C. 154(b) by 690 days.

(21) Appl. No.: 13/994,874

(22) PCT Filed: Nov. 23, 2011

(86) PCT No.: PCT/IB2011/002811
§ 371 (c)(1),
(2), (4) Date: Jul. 31, 2013

(87) PCT Pub. No.: WO2012/080792
PCT Pub. Date: Jun. 21, 2012

(65) Prior Publication Data

US 2014/0302246 A1 Oct. 9, 2014

(30) Foreign Application Priority Data

Dec. 17, 2010 (JP) ................................ 2010-282286

(51) Int. Cl.
*B05D 5/06* (2006.01)
*B05D 3/00* (2006.01)
(Continued)

(52) U.S. Cl.
CPC ............ *B05D 3/007* (2013.01); *B05D 7/534* (2013.01); *B05D 7/574* (2013.01); *B05D 5/06* (2013.01);
(Continued)

(58) Field of Classification Search
CPC .. B05D 7/50–7/5885; B05D 7/14–7/18; C25D 7/00
See application file for complete search history.

(56) References Cited

U.S. PATENT DOCUMENTS

| | | | | |
|---|---|---|---|---|
| 5,165,969 A * | 11/1992 | Barlett | B05B 15/1207 118/326 |
| 2002/0009550 A1 * | 1/2002 | Yoshioka | C09D 171/02 427/407.1 |

(Continued)

FOREIGN PATENT DOCUMENTS

| | | |
|---|---|---|
| GB | 2468255 A | 9/2010 |
| JP | H1149993 A | 2/1999 |

(Continued)

OTHER PUBLICATIONS

Amano et al., JP 2006-88025, English Abstract and Machine Translation (2006).*

(Continued)

*Primary Examiner* — Bryan D. Ripa
*Assistant Examiner* — Ho-Sung Chung
(74) *Attorney, Agent, or Firm* — Oblon, McClelland, Maier & Neustadt, L.L.P.

(57) ABSTRACT

Disclosed is a method for the formation of multi-layer paint films with the omission of a mid-coat paint coating process. The method comprises the use of a particular aqueous colored paint (A) comprising a prescribed amount of specified titanium oxide that has been compounded, The resulting multi-layer paint films have a very bright paint color, and especially a white or light-colored color, and have excellent concealing properties. The aqueous colored paint (A) is characterized by containing from 50 to 60 mass % with respect to the whole paint solid fraction of titanium oxide of specific surface area not more than 13 $m^2/g$.

8 Claims, 1 Drawing Sheet

(51) Int. Cl.
*B05D 7/14* (2006.01)
*C25D 7/00* (2006.01)
*B05D 7/00* (2006.01)

(52) U.S. Cl.
CPC ...... *B05D 2451/00* (2013.01); *B05D 2601/24* (2013.01); *C25D 7/00* (2013.01)

(56) References Cited

U.S. PATENT DOCUMENTS

2002/0122892 A1* 9/2002 Dattilo ................ B05B 12/1418 427/240
2003/0031785 A1* 2/2003 Rentschler ............ C09C 1/3661 427/212
2003/0087028 A1* 5/2003 Tojo ......................... B05D 1/32 427/156
2004/0043156 A1 3/2004 Emch
2009/0020635 A1* 1/2009 Yasuda ................. B05B 3/1064 239/703
2009/0117383 A1* 5/2009 Isobe ..................... C01G 23/00 428/402
2009/0130322 A1* 5/2009 Nagano ............. C08G 18/6204 427/407.1

FOREIGN PATENT DOCUMENTS

JP 2003334488 A 11/2003
JP 2005177632 A 7/2005
JP 2006-88025 * 4/2006 ............... B05D 1/04
WO WO2005023437 A2 3/2005
WO WO 2009019547 A2 * 2/2009 ............. B05D 7/572

OTHER PUBLICATIONS

International Preliminary Report on Patentability for International Application No. PCT/IB2011/002811 dated Jun. 18, 2013, 7 pages.
International Search Report for International Application No. PCT/IB2011/002811 dated Apr. 27, 2012, 5 pages.
Written Opinion for International Application No. PCT/IB2011/002811 dated Apr. 27, 2012, 7 pages.

* cited by examiner

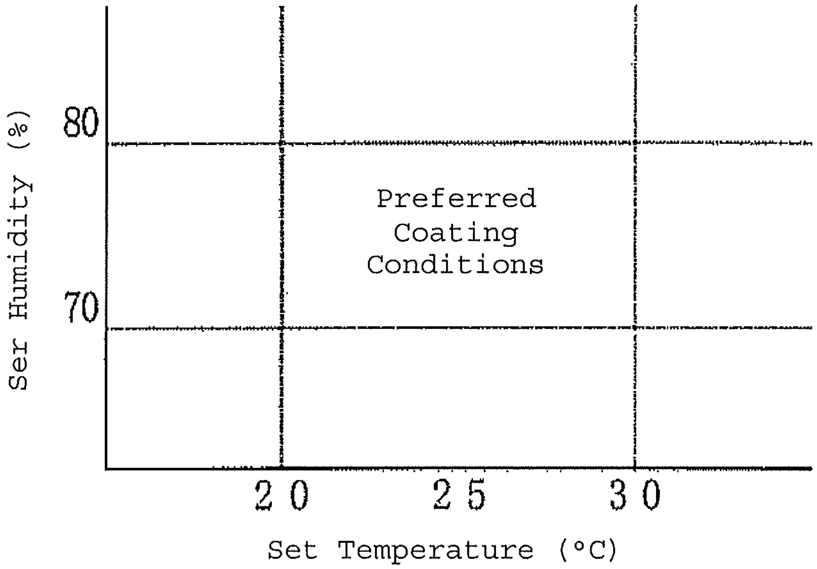
Ser Humidity (%)
80
70
Preferred
Coating
Conditions
20
25
30
Set Temperature (°C)

METHOD FOR THE FORMATION OF MULTI-LAYER PAINT FILMS

CROSS REFERENCE TO RELATED APPLICATIONS

This application is a National Phase Application of Patent Application PCT/EP2011/002811 filed on 23 Nov. 2011, which claims priority to JP 2010-282286 filed 17 Dec. 2010, of which both applications are incorporated by reference herein in their entirety.

TECHNICAL FIELD

The present invention concerns a method for the formation of multi-layer paint films, and more precisely the invention concerns a method for the formation of multi-layer paint films for use on the outer panels of automobile bodies with which, even though the mid-coat paint film-forming process is omitted, the paint film quality is unchanged from that of the past.

BACKGROUND OF THE INVENTION

A solid-white paint composition which has a high concealing capacity in which a finely divided flake-like pigment is compounded to provide the concealing properties in a white paint composition which includes titanium dioxide is known as a solid-white paint composition which has a high concealing capacity which provides satisfactory concealing properties when coated directly by means of electro-deposition coating without the application of a mid-coat paint. Furthermore, a method of coating which is characterized in that coating is carried using the solid-white paint composition which has a high concealing capacity on an under-coat coated base material without forming a mid-coat paint film and cured without forming a clear paint film over the top has also been disclosed (for example, see Japanese Unexamined Patent Application laid open H11-049993). However, when a fine aluminum pigment or a fine graphite pigment is used for the finely-divided flake-like pigment in order to obtain good concealing properties, the color as a metallic pigment of black pigment appears strongly and there is a disadvantage in that the paint film does not have a solid-white color. In addition, the paint film thickness when curing must be from 10 to 60 μm, and preferably from 15 to 40 μm (from 35 to 65 μm in the illustrative examples) and this is disadvantageous in terms of cost.

Furthermore, a method comprising the sequential over-coating of an aqueous white based paint (A), an aqueous mica-based paint (B) and an organic solvent type acid/epoxy based clear paint (C) on the object which is to be coated is known as a method for the formation of a multi-layer paint film for automobile purposes, and it has been disclosed that the whiteness of the paint film alone as an L-value is ideally at least 85 and more desirably at least 90, and that a white pigment which has a particle diameter generally within the range from 0.0001 to 0.5 μm, such as titanium white, flowers of zinc or the like, is compounded in an amount generally within the range from 50 to 200 parts by weight per 100 parts by weight in total of the base resin and crosslinking agent as the white pigment which can be compounded in the white base paint (for example, see Japanese Unexamined Patent Application laid open 2003-334488). However, with this method the object to be coated is an object where a mid-coat paint has been coated on an electro-deposited paint film and so the concealing properties of the base paint are inadequate when no mid-coat paint has been applied.

Furthermore, a method of coating which is characterized in that, in the coating process of an aqueous top coat base paint and clear paint the aqueous paint coating process which has a first aqueous paint coating process in which the inner panel parts of the aforementioned automobile body are coated and then a second aqueous paint coating process in which the outer panel parts of the aforementioned automobile body are coated, the set temperature of the air in the aforementioned first flash-off process is set in such a way that the painted solid fraction of the paint film on the inner panel parts of the automobile body coated in the aforementioned first aqueous paint coating process is above a prescribed value when the aforementioned second flash-off process is proceeding and is completed is known (for example, see Japanese Unexamined Patent Application laid open 2005-177632). Thus, it is disclosed that the set temperature of the first flash-off process is set so that the deposited solid fraction of the paint film on the inner panel parts of the body which have been coated in the inner-panel coating zone is at least 70 wt % when the second flash-off process is passed through and completed. However, with this method the relationship between deposited solid fraction and the paint solid fraction immediately before coating is unclear and no findings in connection with the relationship between the volume shrinkage of the aqueous paint and the concealing properties have been obtained.

The present invention is intended to provide a method whereby very brightly colored, and especially white or lightly colored, multi-layer paint films which have excellent concealing properties are formed in a method for the formation of multi-layer paint films in which aqueous colored paints in which a specified titanium oxide has been compounded in a prescribed amount are used and the coating process with a mid-coat paint is omitted.

As a result of thorough research carried out with a view to resolving this problem, the inventors have discovered that the abovementioned problem can be resolved with a multi-layer paint film where aqueous paint in which a prescribed amount of a specified titanium oxide has been compounded is used over a cured paint film of an electro-deposition paint, and the invention is based upon this discovery.

SUMMARY OF THE INVENTION

That is to say, the present invention provides a method for the formation of multi-layer paint films which have a colored paint film layer and a clear paint film layer which has an electro-deposition coating process in which electro-deposition coating is carried out on a base material and a cured electro-deposited paint film where the L value of the paint film is from 30 to 50 is formed, a first colored paint coating process in which, after the electro-deposition coating process, a first aqueous colored paint (A) which is characterized by containing from 50 to 60 mass % with respect to the whole paint solid fraction of titanium oxide of specific surface area not more than 13 $m^2/g$ is coated over the cured electro-deposited paint film, a preliminary heating process in which preliminary heating is carried out with the first colored paint film which has been formed by means of the first colored paint coating process, a clear coating process in which the coating of a clear paint (C) is carried out over the preliminary heated first colored paint film, and a curing process in which the clear paint film which has been formed in the clear coating process and the preliminary heated first colored paint film are heated and cured at the same time, and in which the L-value of the first colored paint film is 85 or above and the difference when the paint solid fraction content of the first colored paint film 2 minutes after coating the first aqueous colored paint (A) is compared with the paint solid fraction content of the first aqueous colored paint (A) immediately before coating is not more than 11 mass %.

Furthermore, the invention provides a method for the formation of multi-layer paint films which have colored paint film layers and a clear paint film layer which has an electro-deposition coating process in which electro-deposition coating is carried out on a base material and a cured electro-deposited paint film where the L value of the paint film is from 30 to 50 is formed, a first colored paint coating process in which, after the electro-deposition coating process, a first aqueous colored paint (A) which is characterized by containing from 50 to 60 mass % with respect to the whole paint solid fraction of titanium oxide of specific surface area not more than 13 $m^2/g$ is coated over the cured electro-deposited paint film, a second colored paint coating process in which a second aqueous colored paint (B) which contains a glitter pigment (excluding aluminum pigment) is coated over the first colored paint film formed in the first colored film coating process, a preliminary heating process in which the first colored paint film and the second colored paint film formed by means of the second colored paint coating process are subjected to preliminary heating, a clear coating process in which the coating of a clear paint (C) is carried out over the preliminary heated second colored paint film, and a curing process in which the clear paint film which has been formed in the clear coating process, the preliminary heated first colored paint film and the preliminary heated second colored paint film are heated and cured at the same time, and in which the L-value of the first colored paint film is 85 or above and the difference when the paint solid fraction content of the first colored paint film 2 minutes after coating the first aqueous colored paint (A) is compared with the paint solid fraction content of the first aqueous colored paint (A) immediately before coating is not more than 11 mass %.

Furthermore, the invention provides a method for the formation of multi-layer paint films as claimed in claim 2 in which, in the abovementioned method for the formation of a multi-layer paint film, there is a preliminary heating process in which preliminary heating of the first colored paint film which has been formed in the first colored paint coating process is carried out between the first colored paint coating process and the second colored paint coating process.

By means of the method for the formation of multi-layer paint films of this invention it is possible to form very bright colored, and especially white or light colored, multi-layer paint films which have excellent concealing properties even with paint colors of high brightness with an L-value of 85 or above which are liable to be affected by the color of the electro-deposited paint film.

BRIEF DESCRIPTION OF THE DRAWING

FIG. 1 is a diagram which shows the preferred coating conditions for the temperature and humidity when coating in the present invention.

DETAILED DESCRIPTION OF A PREFERRED EMBODIMENT OF THE INVENTION

One embodiment of the method for the formation of multi-layer paint films of this invention is a method for the formation of a multi-layer paint film which includes an electro-deposition coating process, a first colored paint coating process, a preliminary heating process, a clear coating process and a curing process (this is referred to hereinafter as the two-coat-one-bake multi-layer paint film forming method).

Furthermore, another embodiment of the method for the production of multi-layer paint films of this invention is a method for the formation of multi-layer paint films which includes an electro-deposition coating process, a first colored paint coating process, a second colored paint coating process, a preliminary heating process, a clear coating process and a curing process (this is referred to hereinafter as the three-coat-one-bake multi-layer paint film forming method). Various types of electro-deposition paint can be cited as electro-deposition paints for forming the cured paint film which is formed on an object which is to be coated with an aqueous colored paint in the electro-deposition coating process, but cationic electro-deposition paints are preferred.

At least one selected from among pre-surface treated alloyed molten zinc plated steel sheet, molten zinc plated steel sheet, electro-zinc plated steel sheet and cold rolled steel sheet is ideal for the base material on which the electro-deposition paint is coated.

Furthermore, the L-value of the electro-deposited paint film formed by the electro-deposition coating process is from 30 to 50. If the L-value of the electro-deposited paint film is more than 50 then the electro-deposited paint film itself has a white or light grey color and so it is possible to obtain a multi-layer paint film which has good concealing properties with a colored paint film which has an L-value of at least 85 without using the aqueous colored paint (A). Furthermore, in those cases where the L-value of the electro-deposited paint film is less than 30 it is difficult to obtain a paint film which has adequate concealing properties with an L-value of at least 85 even with the aqueous colored paint (A).

Moreover, in this invention other coating processes known in the automobile painting field, such as locally applied chipping primer and the like, can be carried out prior to the aqueous colored paint (A) coating process.

In this invention the first colored paint coating process is carried out after the electro-deposition coating process.

The first colored paint coating process is a process in which a first aqueous colored paint (A) which is characterized in that it contains from 50 to 60 mass % with respect to the whole of the paint solid fraction of titanium oxide of which the specific surface area is not more than 13 $m^2/g$ is coated over the cured electro-deposited paint film.

Moreover, in those cases where another coating process as mentioned above is carried out locally before the first aqueous colored paint (A) coating process, part of the paint film where the first aqueous colored paint (A) has been coated forms another paint film which is formed on the surface of the cured electro-deposited paint film. Hence, in the first colored paint coating process the expression "on the cured electro-deposited paint film" signifies not only directly on the surface of the cured electrodeposited paint film but also on the surface of another paint film which has been formed on the surface of the cured electro-deposited paint film.

The titanium oxide which is included in the first aqueous colored paint (A) is preferably titanium oxide of the rutile type and it may have been produced by means of the chlorine method or the sulfuric acid method, and it should have been surface treated in the usual way.

The specific surface area of the titanium oxide which can be used in the first aqueous colored paint (A) is not more than 13 $m^2/g$, and preferably from 12 to 13 $m^2/g$. If the specific surface area exceeds 13 $m^2/g$ then the ability to conceal the underlying base color is poor. The lower limit for the specific surface area of the titanium oxide is preferably 8 $m^2/g$ or more, and more desirably 10 $m^2/g$ or more. Moreover, the specific surface area of the titanium oxide in this invention is obtained with the BET method.

The proportion of titanium oxide of specific surface area not more than 13 $m^2/g$ in the first aqueous colored paint (A) is from 50 to 60 mass %, and preferably from 51 to 58 mass %, with respect to the whole of the paint solid fraction. With a titanium oxide of specific surface area not more than 13 $m^2/g$ content with respect to the paint solid fraction content of less than 50 mass % there is little concealing effect, and if the content exceeds 60 mass % then this results in a lowering of the paint film performance in respect of impact resistance and the like.

Furthermore, in this invention the L-value of the paint film of the first aqueous colored paint (A) is at least 85, and preferably at least 90.

The L-value in this invention is the L-value of the color difference specified by the L-value, a-value and b-value of the Hunter color difference system. The L-value expresses the brightness, and a higher value indicates more whiteness.

The L-value in this invention is the color difference measured using a color difference meter (CR-400, produced by the Konika Minolta Co.).

In the three-coat-one-bake method for the formation of a multi-layer paint film of this invention a second colored paint coating process in which a second aqueous colored paint (B) which contains a glitter pigment (excluding aluminum pigment) is coated is carried out after the first colored paint coating process.

The glitter pigment which is included in the second aqueous colored paint (B) is a finely divided scale-like pigment such as a metal oxide coated mica pigment, metal oxide coated synthetic mica pigment, metal oxide coated alumina flake pigment, metal oxide coated silica flakes, mica or the like, and a pigment which has a light color is preferred. However, aluminum pigment has a metallic tone color and so cannot be not included in the second aqueous colored paint (B).

The amount of glitter pigment included in the second aqueous colored paint (B) is preferably from 0.1 to 25 mass % with respect to the paint solid fraction from the viewpoints of design and appearance.

In those cases where the amount of glitter pigment (excluding aluminum pigment) included in the second aqueous colored paint (B) is less than 0.1 mass % no glitter effect is seen, and if the content exceeds 25 mass % then it is likely to result in a worsening of the appearance such as reduced gloss and the like.

Aqueous thermosetting-type paints which include base resin, crosslinking agent and plasticizer, as required, for example, as resin structural components can be used for the first aqueous colored paint (A) and the second aqueous colored paint (B) in this invention.

Examples of the base resin include acrylic resins, polyester resins, epoxy resins, polyurethane resins, polyurethane/acrylic resins and the like.

Examples of the crosslinking agents include melamine resins, blocked isocyanates and the like.

Examples of the plasticizers include polyether plasticizers such as polyethylene glycol, polypropylene glycol and the like.

Furthermore, those resins which are already known as resins for use in paints can be used for the base resin and, for example, those which have a number average molecular weight in the range from 2,000 to 30,000, an acid value in the range from 20 to 100 mgKOH/g and a hydroxyl group value in the range from 40 to 200 mgKOH/g can be used ideally. With such base resins, some or all of the carboxyl groups in said resin are preferably neutralized with a basic material such as ammonia, an amine such as triethylamine, monoethanolamine, diethanolamine, triethanolamine, dimethyl aminoethanol and the like or an alkali metal hydroxide such as sodium hydroxide, for example, in order to facilitate their dissolution or dispersion in water.

Furthermore, alkyl-etherified melamine resin which has been etherified with an alcohol which has from 1 to 8 carbon atoms can be cited as an example of a melamine resin crosslinking agent, and melamine resins which have imino groups can also be used. On the other hand the blocked isocyanates are compounds where the free isocyanate groups of aliphatic, alicyclic or aromatic polyisocyanates have been blocked with blocking agents and those which are already known can be used.

Moreover, the various pigments such as inorganic pigments, organic pigments, true pigments and the like which are already known in the paint industry (but preferably not aluminum pigments and carbon pigments which result in loss of the white solid color which has high brightness) as well as one or more of the various types of additive such as surface controlling agents, antifoaming agents, surfactants, film-formation promotors, thickeners, preservatives, ultraviolet absorbers, photo-stabilizers, antioxidants and the like, one or more of the various types of rheology controlling agent and one or more of the various types of organic solvent can be compounded in the abovementioned first aqueous colored paint (A) and second aqueous colored paint (B).

In this invention the difference when the coated paint solid fraction content 2 minutes after coating of the paint film obtained by coating the aqueous colored paint (A) is compared with the paint solid fraction content immediately before coating is not more than 11 mass %. Generally, when applying a paint, the water fraction is gradually removed from the paint film and the paint solid fraction content in the paint film increases, but it has been discovered that by keeping the paint solid fraction content in the paint film 2 minutes after coating the paint low the concealing power of the multi-layer paint film is markedly improved in this invention. That is to say, if this difference exceeds 11 mass % then the volume shrinkage which occurs on heating is small and the force which is compressing the pigment in the paint film is weak, the filling effect of the titanium oxide pigment is reduced and the concealing ability is reduced. The lower limit for the coated paint solid fraction 2 minutes after coating the paint film obtained by coating with the aqueous colored paint (A) is preferably 4 mass % or more, more desirably 5 mass % or more and most desirably 6 mass % or more. If the lower limit for the coated paint solid fraction 2 minutes after coating the paint film obtained by coating with the aqueous colored paint (A) is less than 4 mass % then it is possible that sagging will occur.

In this invention the booth temperature and humidity when coating are preferably within the ranges from 20 to 30° C. and from 70% to 80% respectively. Outside these conditions there are inevitably cases where the difference on comparing the coated paint solid fraction 2 minutes after coating the paint film obtained with the aqueous colored paint (A) with the paint solid fraction immediately before coating exceeds 11 mass %. The preferred coating conditions are shown in FIG. 1.

In the two-coat-one-bake method for the formation of a multi-layer paint film of this invention the aqueous colored paint (A) which contains the aforementioned titanium oxide is coated over the cured electro-deposited paint film and then the clear paint (C) is coated over this paint film without curing and the paint films of the two layers so obtained are heated and cured at the same time.

Furthermore, in the three-coat-one-bake method for the formation of a multi-layer paint film of this invention the aqueous colored paint (A) which contains the aforementioned titanium oxide is coated over the cured electro-deposited paint film, then the aqueous colored paint (B) which contains glitter pigment (excluding aluminum pigment) is coated over this paint film without curing and then the clear paint (C) is coated over this paint film without curing and the paint films of the three layers so obtained are heated and cured at the same time.

In this invention, as indicated above, the multiple paint film layer is heated and cured all at the same time after coating with the clear paint (C), but the paint films which have been coated using aqueous colored paints are preferably subjected to a preliminary heating process in which preliminary heating is carried out before coating with the clear paint (c).

In the two-coat-one-bake method for the formation of a multi-layer paint film of this invention preliminary heating is carried out with the first colored paint film which has been formed in the first colored paint coating process. The interval from the first colored paint coating process and up to the preliminary heating process is preferably from 3 to 8 minutes, and more desirably from 3 to 6 minutes.

Furthermore, in the three-coat-one-bake method for the formation of a multi-layer paint film of this invention preliminary heating is carried out with the first colored paint film formed by means of the first colored paint coating process and the second colored paint film formed by means of the second colored paint coating process. The preliminary heating may be such that the first colored paint film and the second colored paint film are subjected to preliminary heating at the same time, or the second colored paint coating process may be carried out after subjecting the first colored paint film to preliminary heating and then the second colored paint film which has been formed may be subjected to preliminary heating, but the latter method is preferred. The interval from the first colored paint coating process and/or second colored paint coating process up to the preliminary heating process is preferably from 3 to 8 minutes, and more desirably from 3 to 6 minutes. By carrying out preliminary heating it is possible to obtain a paint film which has excellent concealing properties and a good paint film appearance.

A preliminary heating temperature of from 40 to 90° C., more desirably of from 60 to 90° C. and most desirably of from 60 to 80° C. is preferred for the preliminary heating after coating with the first aqueous colored paint (A) in the two-coat-one-bake method for the formation of a multi-layer paint film of this invention. The preliminary heating time is preferably from 1 to 10 minutes, and more desirably from 2 to 8 minutes. If the preliminary heating temperature and time are within the aforementioned ranges then it is possible to obtain a good paint film appearance.

The solid fraction of the first aqueous colored paint which forms the first aqueous colored paint film after the preliminary heating is preferably from 70 to 95 mass %, and more desirably from 80 to 95 mass %. If the solid fraction of the first aqueous colored paint after preliminary heating is within this range then it is possible to obtain a paint film which has excellent concealing properties and a good paint film appearance.

Furthermore, a preliminary heating temperature of from 40 to 90° C., more desirably of from 60 to 90° C. and most desirably of from 60 to 80° C. is preferred for the preliminary heating after coating with the second aqueous colored paint (B) in the three-coat-one-bake method for the formation of a multi-layer paint film of this invention. The preliminary heating time is preferably from 1 to 10 minutes, and more desirably from 2 to 8 minutes. Moreover, a better paint film appearance can be obtained by carrying out preliminary heating of the first aqueous colored paint film after coating with the first aqueous colored paint (A) as well. The conditions for the preliminary heating of the first aqueous colored paint film are preferably the same as the conditions for the preliminary heating of the first aqueous colored paint film in the two-coat-one-bake method for the formation of a multi-layer paint film of this invention.

The solid fraction of the second aqueous colored paint which forms the second aqueous colored paint film after the preliminary heating and the solid fraction of the first aqueous colored paint which forms the first aqueous colored paint film after the preliminary heating are preferably from 70 to 95 mass %, and more desirably from 80 to 95 mass %. If the solid fractions of the second aqueous colored paint and the first aqueous colored paint after preliminary heating are within this range then it is possible to obtain a paint film which has excellent concealing properties and a good paint film appearance.

In this invention a clear paint coating process is carried out after the preliminary heating process.

In this invention the clear paint (C) may be a paint which is generally used as a clear paint for automobile body purposes, and one-liquid thermosetting paints of the solvent type acrylic/melamine crosslinking type or acid/epoxy crosslinking type can also be used.

No particular limitation is imposed upon the method of coating each paint in this invention but the spray-coating method using an air sprayer, electrostatic air-sprayer or a electrostatic coating machine of the rotary atomizer type is preferred.

The coating temperature of the paint after a preliminary heating may be the same as the preliminary heating temperature, but as mentioned above it is preferably from 20 to 30° C.

The film thickness after baking of each paint film layer in this invention is preferably from 5 to 30 μm for the aqueous colored paint (A) paint film, from 5 to 30 μm for the second aqueous colored paint (B) paint film and from 20 to 50 μm for the clear paint (C) paint film.

In this invention a curing process is carried out after the clear paint coating process.

In the two-coat-one-bake method for the formation of multi-layer paint films of this invention the first colored paint film and the clear paint film are both baked at the same time for heating for curing.

In the three-coat-one-bake method for the formation of multi-layer paint films of this invention the first colored paint film, the second colored paint film and the clear paint film are all baked at the same time for heating and curing.

The baking temperature in the curing process is preferably from 120 to 170° C. and the baking time is preferably from 15 to 30 minutes.

EXAMPLES

The invention is described in more detail below on the basis of illustrative examples. Moreover, parts and % in terms of the amounts compounded signify parts by mass and mass % respectively.

Example of Production 1

Production of Aqueous Colored Paint A-1

Titanium oxide T-1 (66 parts) (specific surface area 12 $m^2/g$, average particle diameter 0.28 μm*) was dispersed in a dispersing machine to a pigment particle size of not more than 10 μm after adding, in a container, 40 parts of an aqueous polyester resin solution (produced by BASF Coatings Japan Ltd, hydroxyl group value 90 mgKOH/g, acid value 25 mgKOH/g, number average molecular weight 2,000, solid fraction 30%), 120 parts of an aqueous polyurethane resin solution (produced by BASF Coatings Japan Ltd, hydroxyl group value 62 mgKOH/g, solid fraction 25%) and 60 parts of de-ionized water and then 20 parts of a melamine resin (produced by the Cytec Co., trade name Cymel 327, methylated melamine resin, involatile fraction 90%), 1.5 parts of surface controlling agent (produced by the Bichemie Co. trade name Biketol WS) and 0.3 part of rheology control agent (produced by the Rohm and Haas Co., trade name Primal ASE-60) were added and mixed in a disperser, the viscosity was adjusted to 40 seconds/Ford cup #4 (20° C.) using deionized water, and the aqueous colored paint A-1 in which the proportion of pigment included with respect to the paint solid fraction was 52% was obtained.

*: The average particle diameter is the result obtained on measuring single particle diameters with an electron microscope.

Example of Productions 2-8

Production of Aqueous Colored Paints A-2 to A-8

The aqueous colored paints A-2 to A-8 with the formulations shown in Table 1 and Table 2 were produced in the same way as the aqueous colored paint A-1.

Example of Production 9

Production of Aqueous Colored Paint B-1

White mica (12 parts) (trade name Iriodin 103 Rutil Sterling Silver, produced by the Merck Co.) was mixed in a disperser after adding, in a container, 40 parts of an aqueous polyester resin solution (produced by BASF Coatings Japan Ltd, hydroxyl group value 90 mgKOH/g, acid value 25 mgKOH/g, number average molecular weight 2,000, solid fraction 30%), 120 parts of an aqueous polyurethane resin solution (produced by BASF Coatings Japan Ltd, hydroxyl group value 62 mgKOH/g, solid fraction 25%) and 20 parts of a melamine resin (produced by the Cytec Co., trade name Cymel 327, methylated melamine resin, involatile fraction 90%), 1.5 parts of surface controlling agent (produced by the Bichemie Co. trade name Biketol WS) and 0.3 part of rheology control agent (produced by the Rohm and Haas Co., trade name Primal ASE-60), the viscosity was adjusted to 40 seconds/Ford cup #4 (20° C.) using de-ionized water, and the aqueous colored paint B-1 in which the proportion of pigment included with respect to the paint solid fraction was 20% was obtained.

TABLE 1

| | Production Example 1 | Production Example 2 | Production Example 3 | Production Example 4 |
|---|---|---|---|---|
| Aqueous Colored Paint | A-1 | A-2 | A-3 | A-4 |
| Titanium Oxide T-1 | 66 | | 78 | |
| Titanium Oxide T-2 | | 66 | | 78 |
| Titanium Oxide T-3 | | | | |
| White Mica | | | | |
| Polyester Resin | 40 | 40 | 40 | 40 |
| Aqueous Urethane Resin | 120 | 120 | 120 | 120 |
| Melamine Resin | 20 | 20 | 20 | 20 |
| Surface Controlling Agent | 1.5 | 1.5 | 1.5 | 1.5 |
| Rheology Controlling Agent | 0.3 | 0.3 | 0.3 | 0.3 |
| De-ionized Water | 112.2 | 112.2 | 139.5 | 139.5 |
| TOTAL | 360 | 360 | 399.3 | 399.3 |
| Total Resin Solid Fraction Content | 60 | 60 | 60 | 60 |
| Average Specific Surface Area of the Titanium Oxide ($m^2/g$) | 12 | 13 | 12 | 13 |
| Titanium Oxide Content with Respect to Paint Solid Fraction (mass %) | 52 | 52 | 56.5 | 56.5 |
| White Mica Content with Respect to Paint Solid Fraction (mass %) | | | | |

TABLE 2

| | Production Example 5 | Production Example 6 | Production Example 7 | Production Example 8 | Production Example 9 |
|---|---|---|---|---|---|
| Aqueous Colored Paint | A-5 | A-6 | A-7 | A-8 | B-1 |
| Titanium Oxide T-1 | 50 | 110 | | | |
| Titanium Oxide T-2 | | | | | |
| Titanium Oxide T-3 | | | 66 | 78 | |
| White Mica | | | | | 15 |
| Polyester Resin | 40 | 40 | 40 | 40 | 40 |
| Aqueous Urethane Resin | 120 | 120 | 120 | 120 | 120 |
| Melamine Resin | 20 | 20 | 20 | 20 | 20 |
| Surface Controlling Agent | 1.5 | 1.5 | 1.5 | 1.5 | 1.5 |
| Rheology Controlling Agent | 0.3 | 0.3 | 0.3 | 0.3 | 0.3 |
| Deionized Water | 85.5 | 174.9 | 112.2 | 139.5 | 106.2 |
| TOTAL | 317.3 | 466.7 | 360 | 399.3 | 303 |
| Total Resin Solid Fraction Content | 60 | 60 | 60 | 60 | 60 |
| Average Specific Surface Area of the Titanium Oxide ($m^2/g$) | 12 | 12 | 18 | 18 | |
| Titanium Oxide Content with Respect to Paint Solid Fraction (mass %) | 45.5 | 64.7 | 52 | 56.5 | |
| White Mica Content with Respect to Paint Solid Fraction (mass %) | | | | | 20 |

Footnote to Tables 1 and 2

Titanium Oxide T-2: Specific surface area 13 $m^2/g$, average particle diameter 0.25 μm Titanium Oxide T-3: Specific surface area 18 $m^2/g$, average particle diameter 0.27 μm Examples 1 to 4

The cationic electro-deposition paint CathoGuard No. 500 (trade name, produced by BASF Coatings Japan Ltd.) was electro-deposition coated in such a way as to provide a cured film thickness of about 20 μm on an alloyed molten zinc-plated steel sheet which has been subjected to a zinc phosphate chemical forming treatment, heated to 160° C. for 30 minutes and cured. The L-value of the electro-deposited paint film was 41.

The aqueous colored paints A-1 to A-4 shown in Table 1 were each coated in such a way as to provide a cured film thickness of 10 μm over an electro-deposited paint film and left to stand in the booth for 5 minutes (corresponding to the interval from the first colored paint coating process up to the preliminary heating process) and then subjected to preliminary heating for 3 minutes at 80° C., after which the acrylic/melamine resin-based clear paint Belcoat No. 6100 Clear (trade name, produced by BASF Coatings Japan Ltd) was coated as the clear coat paint (C) in such a way as to provide a film thickness after curing of 35 μm, the sheet was left to stand in the booth for 5 minutes and then heated and cured at 140° C. for 25 minutes to prepare a test piece for paint film evaluation purposes. Furthermore, in the case of Examples 1 to 4, the booth temperature and humidity were set to 25° C. and 75% for adjusting the coated paint solid fraction 2 minutes after coating. Furthermore, in Examples 1 to 4 the solid fraction of the paint film of the aqueous colored paint after preliminary heating was from 80 to 90%.

Moreover, the test pieces for evaluating the concealing power of the paint film were prepared in the same way except that when preparing the test piece as described in the example above, a piece of white concealing paper (trade name Concealing Power Test Paper, produced by the Nippon Test Panel Co.) cut to a flat surface size of 6 cm×3 cm was stuck onto part of the cured electro-deposited paint film (paint film flat surface 15 cm×7 cm) and then coated with each of the aqueous colored paints A-1 to A-8 shown in Tables 1 and 2 in such a way as to provide a cured film thickness of 10 μm in each case.

Comparative Examples 1 to 6

Test pieces were prepared in the same way as in the examples except that each of the aqueous colored paints A-5 to A-8, A-1 and A-2 shown in Table 1 and Table 2 in the abovementioned examples were coated in such a way as to provide a cured film thickness of 10 μm in each case. Furthermore, the temperature and humidity in the booth for adjusting the coated paint solid fraction 2 minutes after coating were set to 25° C./75% in the case of Comparative Examples 1 to 4 and to 25° C./60% in the case of Comparative Examples 5 and 6.

Furthermore, the test pieces for evaluating the concealing powers of the multi-layer paint films were produced in the same way as in the abovementioned examples.

The multi-layer paint film test pieces obtained in the examples and comparative examples were evaluated using the methods of evaluation indicated below. The results of the evaluations are shown in Table 3 and Table 4.

Evaluation of the Concealing Power of Multi-layer Paint Films

Evaluation of the concealing power of the multi-layer paint films obtained with the processes outlined above was carried out on the following basis. The difference in the concealment by the multi-layer paint film formed over the abovementioned commercial white concealing paper which had been stuck onto the cured electro-deposited paint film and the multi-layer paint film formed over the part of the cured electro-deposited paint film on which no commercial concealing paper had been stuck was assessed visually and the concealing power was evaluated on the basis of the criteria indicated below. The results are shown in Table 3 and Table 4.

○: Concealment of the white concealing paper and concealment of the cured electro-deposited paint film in the visual assessment were the same.

X: Concealment of the cured electro-deposited paint film in the visual assessment was inadequate when compared with the white concealing paper.

Furthermore, for the concealing power of the aqueous colored paint coated films in Table 3 and Table 4, commercial white concealing rate test paper was stuck onto the abovementioned cured electro-deposited paint film and coating was carried out with each of the aqueous colored paints (A-1 to A-8) shown in Table 3 and Table 4 below, after which the paint films which had been heated and cured for 25 minutes at 140° C. without the application of a clear paint were evaluated on the basis of the following criteria:

○: Concealment of the white concealing paper and concealment of the cured electro-deposited paint film in the visual assessment were the same.

X: Concealment of the cured electro-deposited paint film in the visual assessment was inadequate when compared with the white concealing paper.

Moreover, the L-values of the aqueous colored paint coated films in Table 3 and Table 4 are the results measured using a color difference meter (CR-400, produced by the Konika Minolta Co.) with a paint film where the aqueous colored paint (A-1 to A-8) shown in Table 3 and Table 4 had been coated on the abovementioned cured electro-deposited paint film and then heated and cured for 25 minutes at 140° C. without the application of the clear paint.

Method of Measuring the Coated Paint Solid Fraction 2 Minutes after Coating and the Paint Solid Fraction Immediately Before Coating Measurements were carried out using the methods indicated below and the difference Δ (WO) was calculated.

$$WO=W2-W1$$

Paint solid fraction (W1) immediately before coating: In accordance with the measurement of the residue on heating of JIS K5601-1-2.

Coated paint solid fraction (W2) 2 minutes after coating: Aluminum foil of which the mass (W3) had been measured was stuck with masking tape onto the object to be coated and, after coating with the paint, the aluminum foil was peeled away from the steel sheet. The mass (W4) of the aluminum foil to which the paint had been applied was measured and then the mass (W5) after drying for 30 minutes at 140° C. was measured. Calculation: The coated paint solid fraction (%) was calculated using the following equation:

$$(W2)(\%)=(W5-W3)/(W4-W3)\times 100$$

Measurement of the Color Tone of the Multi-layer Paint Films

The appearance of a multi-layer paint film was assessed visually to determine the color tone of the multi-layer paint film.

Method of Evaluation in the Impact Resistance Test

The test was carried out in accordance with the falling weight resistance test of JIS K5600-5-3 using a DuPont type impact deformation testing machine of height 50 cm with a weight of mass 500 g of radius 6.35 mm. The evaluation was made on the basis of the following criteria:

○: No cracking or peeling occurred

X: Cracking and/or peeling occurred

TABLE 3

| | Example 1 | Example 2 | Example 3 | Example 4 | Example 5 |
|---|---|---|---|---|---|
| Aqueous Colored Paint (A) | A-1 | A-2 | A-3 | A-4 | A-1 |
| Average Specific Surface Area of the Titanium Oxide | 12 | 13 | 12 | 13 | 12 |
| Titanium Oxide Content with Respect to the Paint Solid Fraction (mass %) | 52 | 52 | 56.5 | 56.5 | 52 |
| Aqueous Colored Paint (B) | — | — | — | — | B-1 |
| Paint Solid Fraction of Aqueous Colored Paint (A) Immediately Before Coating (mass %) | 35 | 35 | 34.6 | 34.6 | 35 |
| Paint Solid Fraction of Aqueous Colored Paint (A) 2 Minutes After Coating (mass %) | 45.8 | 45.8 | 45.1 | 45.2 | 45.8 |
| Difference Δ (W0) (mass %) | 10.8 | 10.8 | 10.5 | 10.6 | 10.8 |
| L-Value of the Aqueous Colored Paint (A) Paint Film | 87 | 86 | 92 | 90 | 87 |
| Evaluated Concealing Power of the Aqueous Colored Paint (A) Paint Film | ○ | ○ | ○ | ○ | ○ |
| Color Tone of the Multi-layer Paint Film | White | White | White | White | White |
| Evaluated Concealing Power of the Multi-layer Paint Film | ○ | ○ | ○ | ○ | ○ |
| Impact Resistance of the Multi-layer Paint Film | ○ | ○ | ○ | ○ | ○ |

TABLE 4

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Aqueous Colored Paint (A) | A-5 | A-6 | A-7 | A-8 | A-1 | A-3 |
| Average Specific Surface Area of the Titanium Oxide | 12 | 12 | 18 | 18 | 12 | 12 |
| Titanium Oxide Content with Respect to the Paint Solid Fraction (mass %) | 45.5 | 64.7 | 52 | 56.5 | 52 | 56.5 |
| Aqueous Colored Paint (B) | — | — | — | — | — | — |
| Paint Solid Fraction of Aqueous Colored Paint (A) Immediately Before Coating (mass %) | 35.5 | 34.5 | 35 | 34.6 | 35 | 34.6 |
| Paint Solid Fraction of Aqueous Colored Paint (A) 2 Minutes After Coating (mass %) | 46.1 | 45.4 | 45.3 | 44.6 | 48.0 | 47.2 |
| Difference Δ (W0) (mass %) | 10.6 | 10.9 | 10.3 | 10.0 | 13.0 | 12.6 |
| L-Value of the Aqueous Colored Paint (A) Paint Film | 81 | 92 | 82 | 83 | 83 | 83 |
| Evaluated Concealing Power of the Aqueous Colored Paint (A) Paint Film | X | ○ | X | X | X | X |
| Evaluated Concealing Power of the Multi-layer Paint Film | X | ○ | X | X | X | X |
| Color Tone of the Multi-layer Paint Film | White | White | White | White | White | White |
| Impact Resistance of the Multi-layer Paint Film | ○ | X | ○ | ○ | ○ | ○ |

Example 5

The cationic electro-deposition paint CathoGuard No. 500 (trade name, produced by BASF Coatings Japan Ltd.) was electro-deposition coated in such a way as to provide a cured film thickness of about 20 μm on an alloyed molten zinc plated steel sheet which has been subjected to a zinc phosphate chemical forming treatment and heated and cured for 30 minutes at 160° C. The L-value of the electro-deposited paint film was 41.

The aqueous colored paint A-1 shown in Table 1 was coated in such a way as to provide a cured film thickness of 10 μm on the electro-deposition paint film and left to stand in the booth for 5 minutes (corresponding to the interval from the first colored paint coating process up to the preliminary heating process) and then heated to 80° C. for 3 minutes, after which the aqueous colored paint B-1 was coated in such a way as to provide a cured film thickness of from 5 to 10 μm and left to stand in the booth for 5 minutes (corresponding to the interval from the second colored paint coating process up to the preliminary heating process) and then heated to 80° C. for 3 minutes, after which the acrylic/melamine resin based clear paint Belcoat No. 6100 (trade name, produced by BASF Coatings Japan Ltd.) was coated as the clear paint (C) in such a way as to provide a cured film thickness of 35 μm and left to stand in the booth for 5 minutes and then heated and cured for 25 minutes at 140° C. to produce a test piece for paint film evaluation purposes. Moreover, adjustment of the coated paint film solid fraction 2 minutes after coating was carried out at a booth temperature and humidity of 25° C./75%. Furthermore, the solid fraction of the aqueous colored paint film after preliminary heating was 85%. The results on evaluating the paint film are shown in Table 3.

Moreover, the test piece for evaluating the concealing power of the paint film was prepared in the same way except that when preparing the test piece as described in the example above, a piece of white concealing paper (trade name Concealing Power Test Paper, produced by the Nippon Test Panel Co.) cut to a flat surface size of 6 cm×3 cm was stuck onto part of the cured electro-deposited paint film (paint film flat surface 15 cm×7 cm) and then the aqueous colored paint A-1 shown in Table 1 was coated in such a way as to provide a cured film thickness of 10 μm on the cured paint film of the electro-deposition paint and commercial white concealing paper.

Moreover, the color tones of the multi-layer paint films were categorized as being white in all of Comparative Examples 1 to 6, but since the color tone of the electro-deposited paint film was not concealed these differed from the color tones of the multi-layer paint films of Examples 1 to 4.

The invention claimed is:

1. A method for the formation of a multi-layer paint film comprising a colored paint film layer and a clear paint film layer, comprising forming an electro-deposition coating by an electro-deposition coating process on a base material so as to form a cured electro-deposited paint film comprising an L-value of from 30 to 50, coating over the cured electro-deposited paint film with a first colored paint coating process comprising a first aqueous colored paint (A) comprising from 50 to 60 mass % with respect to the whole paint solid fraction of a titanium oxide of a specific surface area not more than 13 $m^2/g$ so as to form a first colored paint film, carrying out a preliminary heating process with the first colored paint film after an interval of 3 to 8 minutes from the application of the coating to produce a preliminary heated first colored paint film, carrying out a clear coating process in which a coating of a clear paint (C) is applied over the preliminary heated first colored paint film to form a clear paint film, and heating and curing the clear paint film and the preliminary heated first colored paint film at the same time, wherein the L-value of the first colored paint film is 85 or above and the difference between the paint solid fraction content of the first colored paint film 2 minutes after coating the first aqueous colored paint (A) and the paint solid fraction content of the first aqueous colored paint (A) immediately before coating is from 4 to 11 mass %.

2. The method of claim 1, wherein the first aqueous colored paint (A) is coated directly on the surface of the cured electro-deposited paint film.

3. The method of claim 1, wherein the first aqueous colored paint (A) is coated directly on the surface of the cured electro-deposited paint film, and not on the surface of another paint film on the surface of the cured electro-deposited paint film.

4. The method of claim 1, wherein the L-value of the first colored paint film is an L-value measured at an angle of 0° to a line perpendicular to a surface of the first colored paint film.

5. A method for the formation of a multi-layer paint film comprising a colored paint film layer and a clear paint film layer comprising:

forming an electro-deposition coating by an electro-deposition coating process on a base material so as form a cured electro-deposited paint film comprising an L value of from 30 to 50, coating over the cured electro-deposited paint film with a first colored paint coating process comprising a first aqueous colored paint (A) comprising from 50 to 60 mass % with respect to the whole paint solid fraction of a titanium oxide of a specific surface area not more than 13 $m^2/g$ so as to form a first colored paint film, coating over the first colored paint film with a second colored paint coating process comprising a second aqueous colored paint (B) comprising a glitter pigment that is not an aluminum pigment to form a second colored paint film, carrying out a preliminary heating process in which the first colored paint film and the second colored paint film are subjected to a preliminary heating after an interval of 3 to 8 minutes from the application of the second coating to produce a preliminary heated first colored paint film and a preliminary heated second colored paint film, carrying out a clear coating process in which a coating of a clear paint (C) is applied over the preliminary heated second colored paint film to form a clear paint film, and heating and curing at the same time the clear paint film, the preliminary heated first colored paint film, and the preliminary heated second colored paint film, wherein the L-value of the first colored paint film is 85 or above and the difference between the paint solid fraction content of the first colored paint film 2 minutes after coating the first aqueous colored paint (A) and the paint solid fraction content of the first aqueous colored paint (A) immediately before coating is from 4 to 11 mass %.

6. The method for the formation of a multi-layer paint film of claim 5, wherein said preliminary heating process comprises carrying out a preliminary heating of the first colored paint film which has been formed by the first colored paint coating process between the first colored paint coating process and the second colored paint coating process, wherein the preliminary heating of the first colored paint film is carried out after an interval of 3 to 8 minutes from the application of the first coating.

7. The method of claim 5, wherein the first aqueous colored paint (A) is coated directly on the surface of the cured electro-deposited paint film.

8. The method of claim 5, wherein the first aqueous colored paint (A) is coated directly on the surface of the cured electro-deposited paint film, and not on the surface of another paint film on the surface of the cured electro-deposited paint film.

* * * * *